No. 786,279. PATENTED APR. 4, 1905.
G. P. FRANKLIN.
APPARATUS FOR MAKING DENTURES.
APPLICATION FILED APR. 7, 1903.
2 SHEETS—SHEET 2.
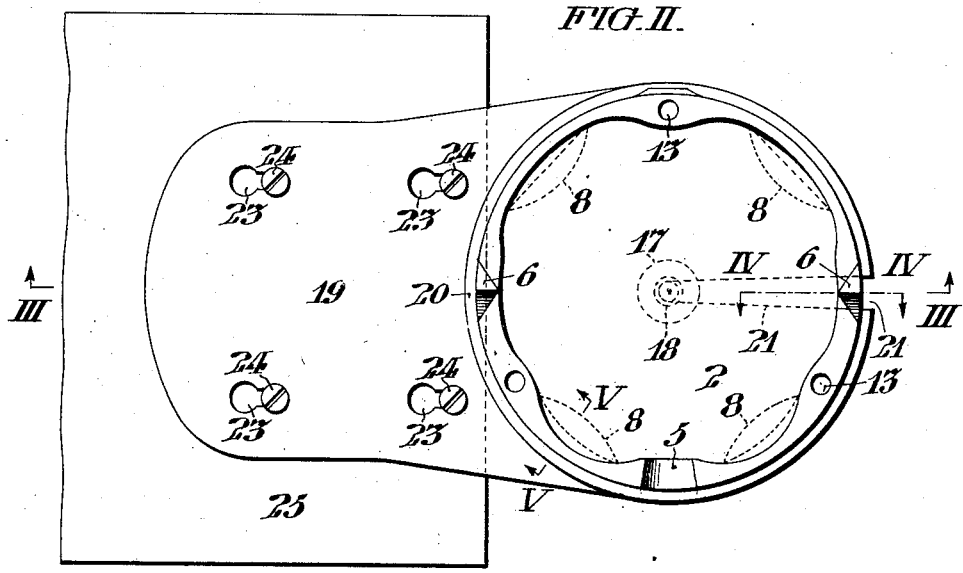
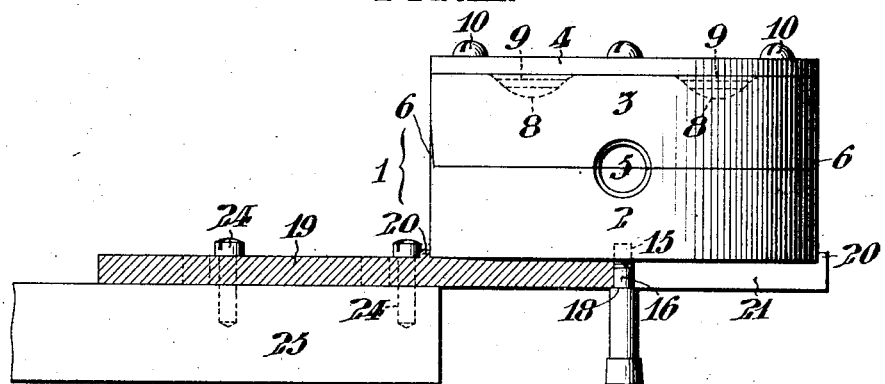
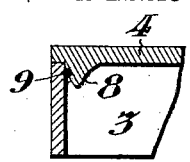
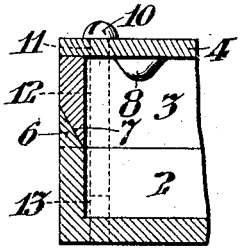
WITNESSES:
Clifton C. Hallowell
John C. Bergner
INVENTOR:
GEORGE P. FRANKLIN,
by Arthur E. Paige
Atty.

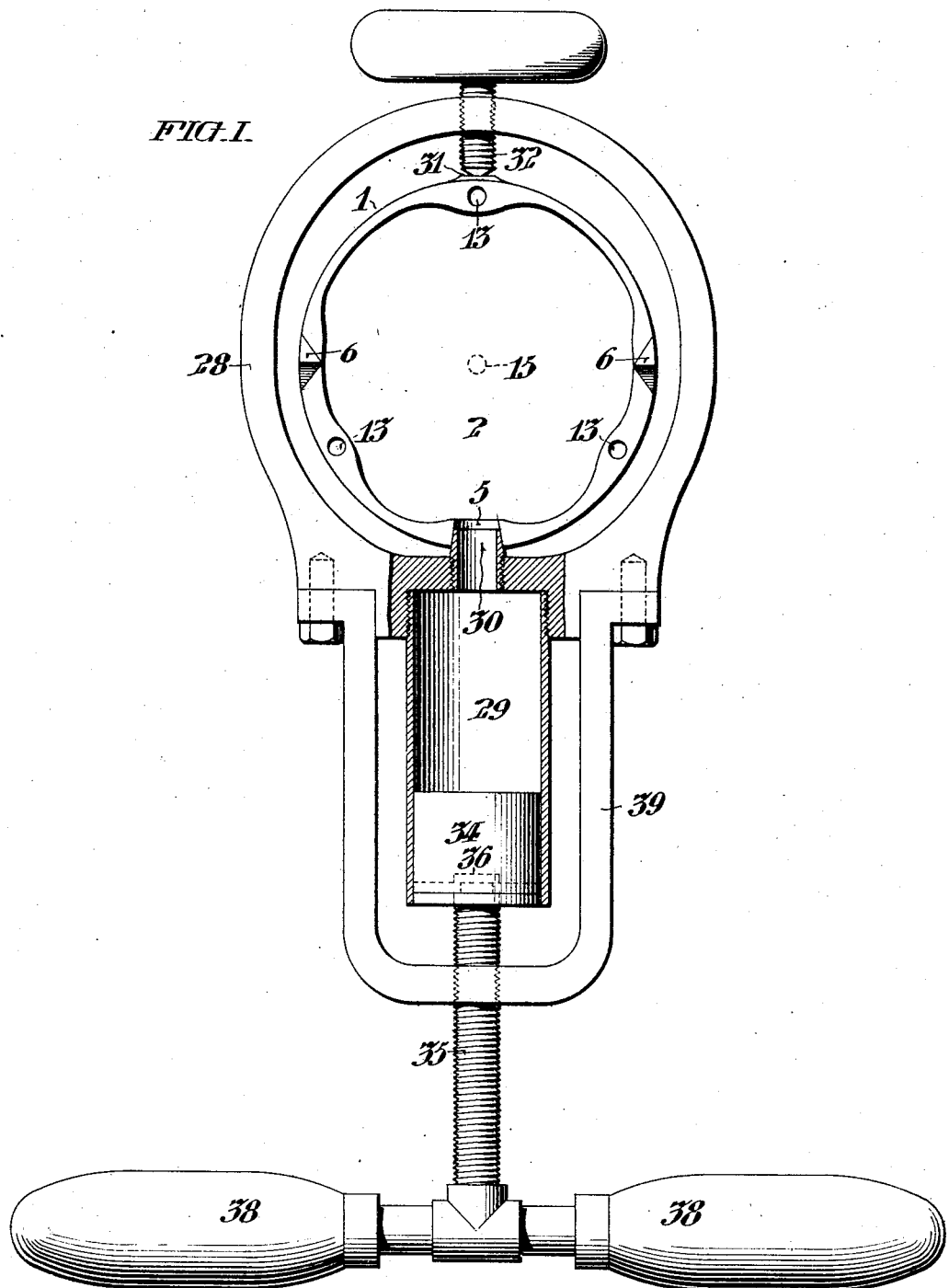

No. 786,279.

Patented April 4, 1905.

UNITED STATES PATENT OFFICE.

GEORGE P. FRANKLIN, OF PHILADELPHIA, PENNSYLVANIA.

APPARATUS FOR MAKING DENTURES.

SPECIFICATION forming part of Letters Patent No. 786,279, dated April 4, 1905.

Application filed April 7, 1903. Serial No. 151,444.

*To all whom it may concern:*

Be it known that I, GEORGE P. FRANKLIN, of Philadelphia, in the State of Pennsylvania, have invented certain new and useful Improvements in Apparatus for Making Dentures, whereof the following is a specification, reference being had to the accompanying drawings.

It is the general object of my invention to combine with a dental flask of improved construction certain devices whereby the flask may be packed and discharged more conveniently and with less expenditure of time and labor than is required in the employment of ordinary apparatus of this class.

It is necessary to provide a dental flask with means to insure that the separable members thereof shall be maintained in registry during the vulcanizing operation, and as ordinarily constructed the drag and cope members of dental flasks are provided for this purpose with projecting dowel-pins or lugs and complementary apertures or recesses, which insure that the members shall also approach each other in a predetermined direction in closing the flask over the plaster cast or model. Such ordinary alining devices are in some cases so disposed that the members must approach each other in a perpendicular direction and in other cases in an oblique direction from front to rear of the flask; but in every flask heretofore known the movement of approach of its members is limited to a single plane, so that extreme care and repeated trials are necessary to close a flask inclosing a full denture model or cast without fracturing the latter or disturbing the relative positions of the light and dark colored rubber strips placed therein. Of course if such disturbance occurs the darker base-rubber penetrates through the lighter facing-rubber in spots and defaces the completed denture. Therefore it is one object of my improvements to provide a flask whose separable members comprise peculiarly-shaped projecting lugs and complementary recesses, which while insuring the precise registry of said members when closed permit of their free movement both laterally and longitudinally during their approach. The advantage of such an arrangement is that the greatest facility is afforded to the operator in the manipulation of the flask members to properly close the same without the aforesaid difficulties.

Ordinary dental flasks are not provided with any means by which they may be secured in stationary position while being packed or be manipulated while hot from the vulcanizing operation, and therefore much inconvenience and loss of time is experienced both in packing and discharging such flasks. My present improvements are advantageous in that they provide a flask with a removable handle, which not only affords means for the operator to remove the flask from the vulcanizer and conveniently manipulate it while hot, but also serves to positively secure the flask in stationary position with respect to a supporting bracket-plate both before and after the vulcanizing operation, and thus facilitates both of the operations of packing and discharging the flask.

The construction of an ordinary flask is such that it must be fully packed with rubber before it is closed, and it is frequently necessary to several times readjust the rubber fragments before the flask can be properly closed. Moreover, it is found necessary in the employment of such a flask to provide channels for the escape of any surplus rubber which might otherwise distort the denture during the vulcanizing operation, and much time is expended in cutting such channels in registry with each other in the opposed members of the plaster cast. My improvements provide a flask which may be closed when only partially packed, and consequently without difficulty, inasmuch as the flask comprises an aperture through which it may be fully charged with rubber after it has been properly closed, and a packing device is provided to augment the charge of rubber through said aperture at any desired pressure.

My invention comprehends the various novel features of construction and arrangement hereinafter more definitely specified and claimed.

In the accompanying drawings, Figure I is a sectional plan view of the packing-frame, showing its relation to the flask, only the drag member of the latter being shown. Fig. II is a plan view of the flask-holder conveniently mounted on a work-bench. Fig. III is a sectional view taken on the line III III in Fig. II, showing the flask secured on said holder by its removable handle. Fig. IV is a fragmentary sectional view of the flask, taken on the line IV IV in Fig. II. Fig. V is a fragmentary sectional view of the flask, taken on the line V V in Fig. II.

In said figures the flask 1 comprises three separable members—the drag 2, the cope 3, and the lid 4. The conical inlet-aperture 5 extends through the wall of the flask 1, and its axis being in the same plane as the parting-line between the cope and drag members said aperture exists partly in each of said members. The drag 2 is provided with triangular pyramidal lugs 6, having their exterior surfaces perpendicular to the parting-line between the drag and cope, and the latter comprises recesses 7, complementary to said lugs 6. The peculiar form of the lugs 6 and recesses 7 permits free oscillation of the cope and drag both laterally and longitudinally during their approach, but insures their precise registry when closed together. The lid 4 is provided with the lugs 8, having grooves 9 to engage the plaster within the cope 3 to retain the lid 4 in proper position before the flask is closed. The screws 10 serve to secure the drag 2, cope 3, and lid 4 in closed position, being entered through smooth apertures 11 and 12 in the lid and cope and screwed in threaded apertures 13 in the drag. The bottom wall of the drag 2 also comprises a screw-threaded socket 15, in which the threaded shank 16 of the handle 17 may be detachably engaged to conveniently manipulate the flask 1 or secure it in stationary position in the flask-holder, comprising the bracket-plate 19, provided with the annular flange 20 and the radial slot 21. The flask and handle being entered in said flask-holder, as shown in Fig. III, may be rigidly secured therein by screwing said handle-shank 16 into said socket 15 until the shoulder 18 of said shank firmly engages the under surface of said plate 19, said shoulder 18 being of greater width than the radial slot 21. As shown in Fig. II, said flask-holder plate 19 comprises slots 23, adapted to detachably engage screws 24, so as to be removably secured in connection with the work bench or table 25.

The annular packing-frame 28 is adapted to receive the flask 1, as indicated in Fig. I, and is provided with the cylinder 29, whose conical nozzle 30 is fitted to the aperture 5 in the flask. The wall of the flask opposite to said aperture 5 is provided with a seat 31 for the set-screw 32, which latter is in threaded engagement with said frame, and by which said flask may be maintained in proper relation with said nozzle. Said cylinder 29 is provided with a piston 34, which is adapted to be reciprocated by the screw-threaded piston-rod 35 in swiveled connection therewith at 36. Said rod 35 is provided with an operating-handle 38 and is in threaded engagement with the yoke 39, which is permanently secured to the frame 28.

The apparatus above described is conveniently employed as follows: A plaster model or cast having been properly set in the flask 1, with opposed plaster-mold members formed therein, the drag member of the flask is secured in rigid relation with the flask-holder 19 by the handle 17, as indicated in Fig. II. The gum-cavity in said mold members is then lined with strips or fragments of pink facing-rubber backed with the usual red or black base-rubber, and the mold-cavity being packed about two-thirds full the flask is closed and secured by the screws 10, as indicated in Fig. III. Thereupon sufficient rubber is introduced to the cylinder 29 to completely pack the flask, and the latter being entered in the annular frame 28 in registry with the cylinder-nozzle 30 and clamped therein by the set-screw 32, as indicated in Fig. I, the handle 38 is then rotated until the piston 34 injects the rubber from the cylinder 29 into the cavity of the flask until the latter is completely packed at any desired pressure. The packing-frame being then released from the flask 1, the handle 17 is detached from the flask by unscrewing its shank 16 from the socket 15, and the flask is deposited in the vulcanizer. When the vulcanizing operation is completed, the hot flask may be conveniently manipulated, by connecting the handle 17 therewith, as above described, and said flask may be again firmly secured on the holder 19, so as to be conveniently opened and unpacked while hot, if desired.

It is to be observed that by reason of the peculiar construction and arrangement of the projecting lugs and complementary recesses in my improved flask above described the latter may be employed with especial advantage in flasking models of full dentures characterized by prominent frontal alveolus, which in ordinary flasks necessitate much loss of time and labor to obtain a proper closure of the flask without disturbing the desired relation of the facing-rubber, &c. However, the peculiar construction described is of advantage in the flasking of any kind of a model in view of the facility which it affords for oscillating the members of the flask both laterally and longitudinally during their approach, so as to accommodate the closing movement of the flask members to any irregularities of contour of the mold or of the rubber inclosed therein. The provision of means to complete the packing of the flask in the peculiar manner described after the flask is closed not only facilitates the operation of packing and lessens the time required for the same, but also insures that the proper amount of rubber shall be introduced at the desired pressure without the necessity of making lateral channels in the plaster-mold members for the overflow of surplus rubber, which channels are required in the use of ordinary flasks. It is also to be noted that the provision of a detachable handle for the flask not only facilitates the flasking operation by affording means for securing the flask in convenient stationary position with respect to the work bench or table, but also saves the time of the operator heretofore wasted in awaiting the cooling of the flask after the vulcanizing operation, inasmuch as said handle permits the flask to be readily manipulated while hot.

I do not desire to limit myself to the precise details of construction and arrangement herein set forth, as it is obvious that various modifications may be made therein without departing from the essential features of my invention.

I claim—

1. In apparatus for making dentures, the combination with a flask member provided with lugs of triangular cross-section; of a flask member provided with recesses complementary to said lugs; said lugs and recesses being shaped and arranged to permit lateral and longitudinal oscillation of said members with respect to each other during their approach, and to insure their precise registry when closed; and, means to secure said members in closed relation, substantially as set forth.

2. In apparatus for making dentures, the combination with a flask member provided with projecting lugs which are triangular in cross-section and tapering toward their free extremities; of a flask member provided with recesses complementary to said lugs; and, means to secure said members in closed relation, substantially as set forth.

3. In apparatus for making dentures, the combination with a flask comprising separable cope and drag members and a conical aperture existing partly in the cope member and partly in the drag member; of means to secure said members in closed relation; a packing-frame adapted to receive said flask; a packing-cylinder mounted in said frame and provided with a conical nozzle fitted to said aperture; a set-screw in said frame, opposed to said nozzle and arranged to maintain said nozzle in registry with said aperture; and, a piston provided with a screw-threaded piston-rod engaged with said frame and arranged to reciprocate in said cylinder, substantially as set forth.

4. In apparatus for making dentures, the combination with a flask provided upon one side with an aperture extending through its wall, and upon the opposite side with a seat for a set-screw; of an annular packing-frame arranged to receive said flask; a cylinder mounted in said frame and provided with a nozzle fitted to said flask-aperture; a set-screw in said frame opposed to said nozzle and arranged to maintain said nozzle in registry with said aperture; and, a piston mounted in said frame to reciprocate in said cylinder, substantially as set forth.

5. In apparatus for making dentures, the combination with separable cope, drag and lid members of a flask, having a conical aperture extending partly in the drag member, and partly in the cope member; said drag member being provided with triangular lugs on its side walls and a screw-threaded socket in its bottom wall; said lid member being provided with plaster-engaging lugs, and said cope member being provided with recesses complementary to said drag-lugs; of means to secure said members in closed relation; a handle provided with a screw-threaded shank; a shoulder on said shank; a bracket-plate, comprising openings for attaching means, an annular flange and a radial slot extending from the center to the circumference of said flange; said slot being of less width at its inner end than the shoulder on said handle, and being arranged to receive the latter; a packing-frame arranged to receive said flask; a packing-cylinder provided with a conical nozzle fitted to said conical aperture in the flask; a set-screw opposed to said nozzle and arranged to engage said flask in registry therewith; a piston arranged to reciprocate within said cylinder; a screw-threaded piston-rod in threaded engagement with said frame in rotary engagement with said piston; and a handle upon said piston-rod, substantially as set forth.

6. In apparatus for making dentures, the combination with a flask member provided with projecting lugs of triangular cross-section; of a second flask member provided with recesses complementary to the lugs of said first flask member; a third flask member provided with plaster-engaging lugs extending within one of said flask members; and, means to secure said members in closed relation, substantially as set forth.

In testimony whereof I have hereunto signed my name, at Philadelphia, Pennsylvania, this 24th day of March, 1903.

GEORGE P. FRANKLIN.

Witnesses:
ARTHUR E. PAIGE,
A. F. GETZFREAD.